United States Patent
Kim et al.

(10) Patent No.: US 11,897,122 B2
(45) Date of Patent: Feb. 13, 2024

(54) ROBOT HAND

(71) Applicants: KOREA UNIVERSITY OF TECHNOLOGY AND EDUCATION INDUSTRY-UNIVERSITY COOPERATION FOUNDATION, Cheonan-si (KR); NAVER LABS Corporation, Seongnam-si (KR)

(72) Inventors: Yong Jae Kim, Cheonan-si (KR); Jong In Kim, Cheonan-si (KR); Jun Suk Yoon, Daejeon (KR)

(73) Assignees: NAVER LABS CORPORATION, Gyeonggi-do (KR); KOREA UNIVERSITY OF TECHNOLOGY AND EDUCATION INDUSTRY-UNIVERSITY COOPERATION FOUNDATION, Chungcheongnam-Do (KR)

( * ) Notice: Subject to any disclaimer, the term of this patent is extended or adjusted under 35 U.S.C. 154(b) by 0 days.

(21) Appl. No.: 16/755,593

(22) PCT Filed: Oct. 11, 2018

(86) PCT No.: PCT/KR2018/011966
§ 371 (c)(1),
(2) Date: Apr. 12, 2020

(87) PCT Pub. No.: WO2019/074296
PCT Pub. Date: Apr. 18, 2019

(65) Prior Publication Data
US 2021/0197403 A1    Jul. 1, 2021

(30) Foreign Application Priority Data
Oct. 13, 2017 (KR) .......................... 10-2017-0133275

(51) Int. Cl.
*B25J 15/10* (2006.01)
*B25J 15/02* (2006.01)
*B25J 15/00* (2006.01)

(52) U.S. Cl.
CPC .......... *B25J 15/0233* (2013.01); *B25J 15/10* (2013.01); *B25J 15/0009* (2013.01)

(58) Field of Classification Search
CPC .... B25J 15/0009; B25J 15/0233; B25J 15/10; B25J 15/103
(Continued)

(56) References Cited

U.S. PATENT DOCUMENTS 4,946,380 A * 8/1990 Lee ...................... B25J 15/0009
                                                        623/24
4,957,320 A * 9/1990 Ulrich ...................... B25J 9/102
                                                        192/56.1
(Continued)

FOREIGN PATENT DOCUMENTS

CN    101214651 A    7/2008
CN    101804633 A    8/2010
(Continued)

OTHER PUBLICATIONS

Chinese Office Action dated Aug. 23, 2022 issued in Chinese Patent Application No. 201880066800.X.

*Primary Examiner* — Dean J Kramer
(74) *Attorney, Agent, or Firm* — Harness, Dickey & Pierce, P.L.C.

(57) ABSTRACT

Disclosed is a robot hand comprising a base, a first bracket provided on an upper portion of the base, a second bracket provided on an upper portion of the base and configured such that the other side of the second bracket is rotatable in a horizontal direction about one side of the second bracket, a plurality of finger modules coupled to upper portions of the first and second brackets, respectively, and configured to tilt (Continued)

in order to grip an object, finger drive units installed on the first and second brackets and configured to transmit driving power to the finger modules and a rotation drive unit installed at one side of the second bracket and configured to transmit driving power so that the other side of the second bracket is rotatable in the horizontal direction about one side of the second bracket.

6 Claims, 6 Drawing Sheets

(58) Field of Classification Search
USPC ............................................. 294/111
See application file for complete search history.

(56) References Cited

U.S. PATENT DOCUMENTS

| | | | | |
|---|---|---|---|---|
| 5,108,140 | A * | 4/1992 | Bartholet | B25J 15/0009 294/106 |
| 5,200,679 | A * | 4/1993 | Graham | B25J 15/0009 294/111 |
| 5,447,403 | A * | 9/1995 | Engler, Jr. | B25J 15/0009 294/111 |
| 5,570,920 | A * | 11/1996 | Crisman | B25J 9/104 294/111 |
| 8,585,111 | B2 * | 11/2013 | Nammoto | B25J 15/10 294/106 |
| 8,660,695 | B2 * | 2/2014 | De La Rosa Tames | B25J 9/1045 700/258 |
| 8,814,241 | B2 * | 8/2014 | Kim | B25J 15/0009 294/106 |
| 9,469,036 | B1 | 10/2016 | Kozlowski et al. | |
| 2010/0259057 | A1 * | 10/2010 | Madhani | B25J 15/0009 294/106 |
| 2011/0163561 | A1 * | 7/2011 | Kim | B25J 9/104 294/111 |
| 2017/0217014 | A1 * | 8/2017 | Riviere | B25J 9/104 |

FOREIGN PATENT DOCUMENTS

| | | | |
|---|---|---|---|
| CN | 102821918 A | 12/2012 | |
| CN | 105150235 A | 12/2015 | |
| CN | 106078777 A | 11/2016 | |
| JP | 2009-078341 A | 4/2009 | |
| KR | 10-0637956 B1 | 10/2006 | |
| KR | 10-2009-0041705 A | 4/2009 | |
| KR | 10-0899108 B1 | 5/2009 | |
| KR | 10-2011-0109431 B1 | 10/2011 | |
| KR | 10-2014-0132837 A | 11/2014 | |
| KR | 10-1490217 B1 | 2/2015 | |
| WO | WO-2017116614 A2 * | 7/2017 | ............ B25J 13/085 |

* cited by examiner

ROBOT HAND

TECHNICAL FIELD

The present invention relates to a robot hand, and more particularly, to a robot hand capable of being precisely controlled and accurately performing an operation corresponding to a shape of an object.

BACKGROUND ART

Recently, studies on humanoid robots (android or humanoid) have been actively conducted. In order for such a humanoid robot to perform a task performed by a human hand, a robot hand capable of implementing a natural motion function is required.

In general, the robot hand has finger assemblies, and a plurality of joints constituting each of the finger assemblies are all operated by motors. That is, the motors are directly attached to the joints, respectively, and the fingers are operated by the motors operating the joints.

However, the driving method as described above has excellent power transmission and high durability but has a disadvantage of occupying a large space and increasing the size and weight of the robot hand.

In order to overcome the above-mentioned disadvantage, a tendon type device using a wire has been developed.

Since the tendon type device uses the wire, the tendon type device occupies a small space and may be miniaturized. However, there may be a problem in that the wire may be loosened when the joint is operated, and precise control may not be possible depending on shapes of joints and methods of implementing wires.

In order to solve this problem, Korean Patent Application Laid-Open No. 2011-0109431 (Patent Document 1) discloses a robot hand in which a damper is installed on a finger joint, a finger may be spread by rotational force of an electric motor, and the finger may be bent by gas pressure in the damper or elastic force of a spring.

In addition, Korean Patent No. 637956 (registered on Oct. 17, 2006) (Patent Document 2) discloses a robot finger structure for controlling a plurality of joints by using a subordinate joint and a small number of motors.

However, even in the case of Patent Documents 1 and 2, a motor is attached to each joint of the finger, which causes an increase in size and weight of the robot hand. Further, simple operations such as an operation of picking up an object and an operation of throwing an object may be performed, but the precise operation required by a surgical robot or an artificial arm cannot be performed.

In addition, because members such as dampers and springs have repulsive properties, it is difficult to estimate the exact position of the finger, and an additional sensor such as a deflection measurement sensor is required to estimate the position.

Accordingly, there is a need for a robot hand capable of being precisely controlled and accurately performing an operation corresponding to a shape of an object.

DISCLOSURE

Technical Problem to be Solved

The present invention has been made in an effort to solve the above-mentioned problem, and an object of the present invention is to provide a robot hand capable of being precisely controlled and accurately performing an operation corresponding to a shape of an object.

Technical problems of the present invention are not limited to the aforementioned technical problems, and other technical problems, which are not mentioned above, may be clearly understood by those skilled in the art from the following descriptions.

Technical Solutions

In order to achieve the above-mentioned object, a robot hand according to an exemplary embodiment of the present invention includes: a base; a first bracket provided on an upper portion of the base; a second bracket provided on an upper portion of the base and configured such that the other side of the second bracket is rotatable in a horizontal direction about one side of the second bracket; a plurality of finger modules coupled to upper portions of the first and second brackets, respectively, and configured to tilt in order to grip an object; finger drive units installed on the first and second brackets and configured to transmit driving power to the finger modules; and a rotation drive unit installed at one side of the second bracket and configured to transmit driving power so that the other side of the second bracket is rotatable in the horizontal direction about one side of the second bracket.

The finger module may include: a first section having one side coupled to the upper portion of the first bracket and the upper portion of the second bracket, and having the other side at which a first link is provided; a second section having one side at which a second link is provided to face the first link, the second section being connected to the first section by two side plates extending between the first link and the second link, the second section having the other side at which a third link is provided to face the second link; a third section having one side at which a fourth link is provided to face the third link of the second section, the third section being connected to the second section by two side plates extending between the third link and the fourth link, the third section having the other side which is a free end portion; and elastic members connectively provided between the first link and the second link, between the second link and the third link, and between the third link and the fourth link so as to allow the first link, the second link, the third link, and the fourth link to cooperatively operate, the elastic members being configured to elastically support the first link, the second link, the third link, and the fourth link at predetermined angles.

The finger module may further include: winding members each provided at any one of two sides of each of the first to fourth links; a first wire having one end wound around the first to fourth links to connect the first to fourth links; a second wire having one end wound around the first to fourth links in a direction opposite to a direction in which the first wire is wound, one end of the second wire being configured to connect the first to fourth links; and pulleys each having an outer circumferential surface around which the other end of the first wire and the other end of the second wire are wound, the pulleys being connected to the finger drive units, and the finger module may be operated in a direction in which the finger module is bent toward the base direction or spread by the driving power of the finger drive unit.

The finger module may further include: hinge pins rotatably installed and penetrating the first to fourth links, the winding members, and the side plates; and ball bearings installed at two ends of each of the hinge pins so as to support the hinge pins so that the hinge pins are rotatable.

First and second fixing holes may be formed in the free end portion of the fourth link, and one end of the first wire and one end of the second wire may be fitted with and fixed to the first and second fixing holes.

The elastic member may be a flat spring or a linear spring.

The finger drive unit and the rotation drive unit each may be a servo motor or an actuator.

Other detailed matters of the exemplary embodiment are included in the detailed description and the drawings.

Advantageous Effects

According to the robot hand according to the exemplary embodiment of the present invention, the finger drive unit is provided for each of the plurality of finger modules, such that the finger modules operate independently. The finger module, which serves as a thumb of a human hand, is installed to be rotatable in the horizontal direction, such that a natural motion may be implemented like a human hand, and as a result, it is possible to accurately perform an operation corresponding to a shape of an object.

In addition, according to the robot hand according to the exemplary embodiment of the present invention, the sections of the finger module, which are connected with the plurality of links, cooperatively operate to implement he finger structure, such that the number of required components is reduced in respect to an operating range and a length of the finger module. As a result, the finger module may be easily manufactured, and manufacturing costs may be reduced.

In addition, according to the robot hand according to the exemplary embodiment of the present invention, the finger module may be quickly restored to the original state by the elastic members provided on the finger module, and the posture of the finger module is controlled by the finger drive unit that transmits driving power to bend or spread the finger module, such that the position of the finger module may be accurately recognized, which enables precise control.

The effects of the present invention are not limited to the aforementioned effects, and other effects, which are not mentioned above, will be clearly understood by those skilled in the art from the claims.

BEST MODE FOR CARRYING OUT THE INVENTION

In the exemplary embodiment of the present invention, a robot hand comprises a base, a first bracket provided on an upper portion of the base, a second bracket provided on an upper portion of the base and configured such that the other side of the second bracket is rotatable in a horizontal direction about one side of the second bracket, a plurality of finger modules coupled to upper portions of the first and second brackets, respectively, and configured to tilt in order to grip an object, finger drive units installed on the first and second brackets and configured to transmit driving power to the finger modules, and a rotation drive unit installed at one side of the second bracket and configured to transmit driving power so that the other side of the second bracket is rotatable in the horizontal direction about one side of the second bracket.

Hereinafter, the exemplary embodiments of the present invention will be described in detail with reference to the accompanying drawings so that those skilled in the art to which the present invention pertains may easily carry out the present invention.

When describing the embodiments, a description of technical contents, which are well known in the technical field to which the present invention pertains but are not directly related to the present invention, will be omitted. This is to more clearly describe the subject matter of the present invention without obscuring the subject matter by omitting any unnecessary description.

Similarly, in the accompanying drawings, some constituent elements are illustrated in an exaggerated or schematic form or are omitted. In addition, a size of each constituent element does not entirely reflect an actual size. Like reference numerals designate like or corresponding elements in the drawings.

Figure 1:
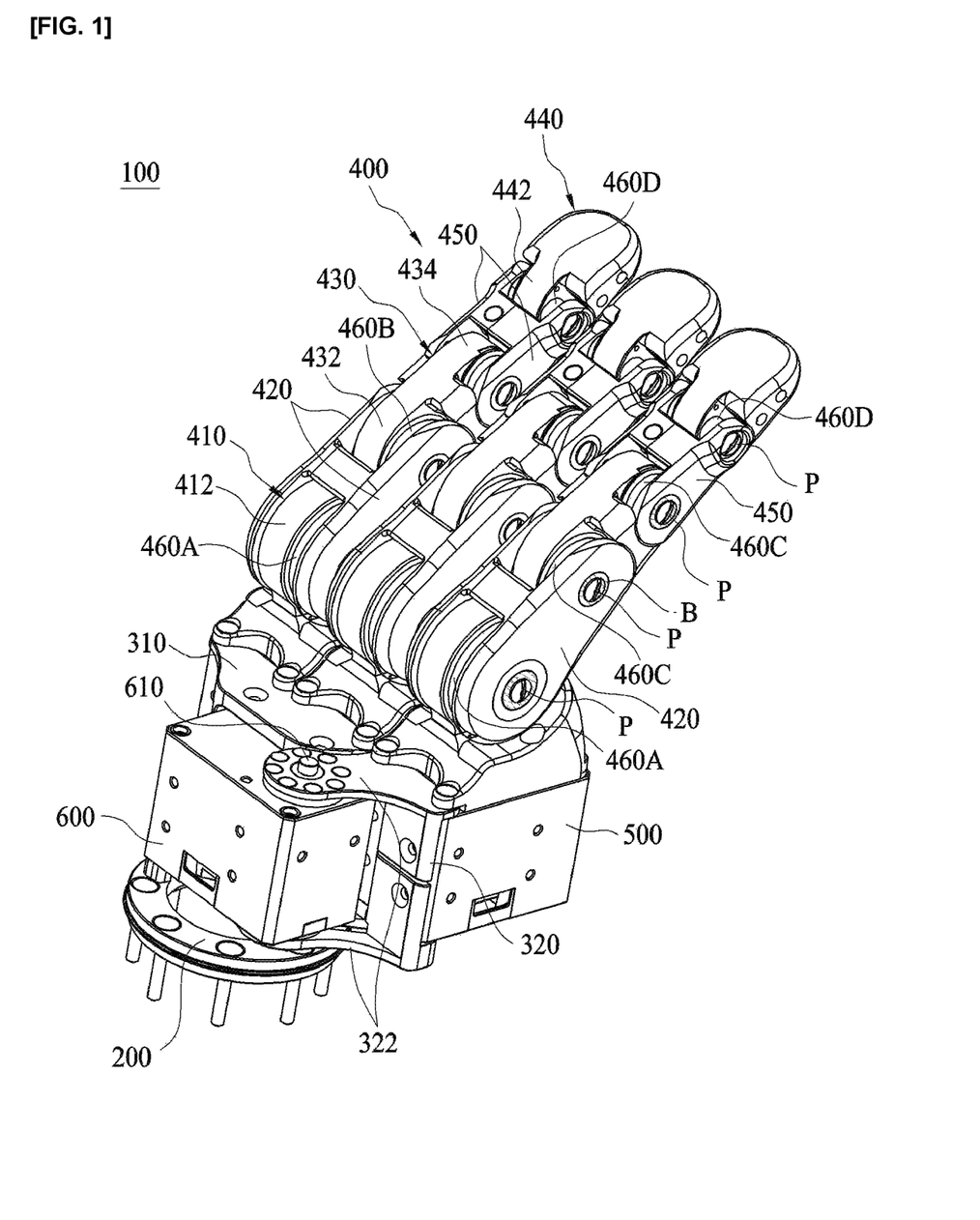
FIG. 1 is a perspective view illustrating a configuration of a robot hand according to an exemplary embodiment of the present invention.

FIG. 1 is a perspective view illustrating a configuration of a robot hand according to an exemplary embodiment of the present invention.

As illustrated in FIG. 1, a robot hand 100 according to an exemplary embodiment of the present invention includes a base 200, a first bracket 310, a second bracket 320, finger modules 400, finger drive units 500, and a rotation drive unit 600.

As illustrated in FIG. 1, an upper portion of the base 200 is provided to support the first and second brackets 310 and 320, the finger modules 400, the finger drive units 500, and the rotation drive unit 600. Although not illustrated, a lower portion of the base 200 may be provided to be coupled to a wrist joint part of a robot.

The first and second brackets 310 and 320 serve to connect the finger modules 400 to the base 200. In the present exemplary embodiment, mounting spaces (not illustrated) are formed in the first and second brackets 310 and 320, respectively, and the finger drive units 500 and the rotation drive unit 600 may be mounted in the mounting spaces.

Figure 6:
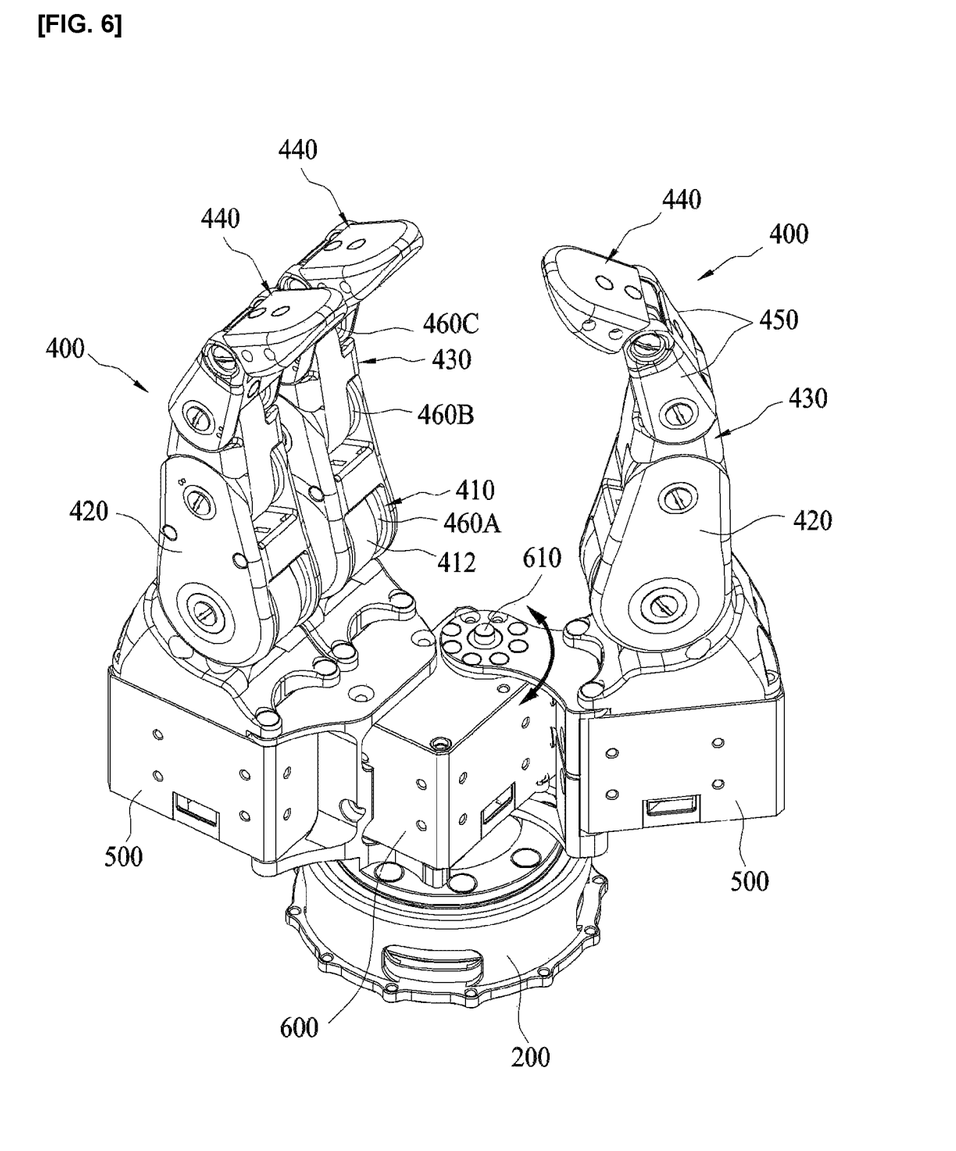
FIG. 6 is an operating state view illustrating the configuration of the robot hand according to the exemplary embodiment of the present invention.

The finger modules 400 are installed on the second bracket 320 and correspond to a human thumb. Link arms 322 are provided on the second bracket 320. The link arms 322 are rotatably coupled to a driving shaft 610 of the rotation drive unit 600. With this configuration, as illustrated in FIG. 6, the second bracket 320 is rotatable about the driving shaft 610 in a horizontal direction.

That is, since the finger module 400, which serves as a thumb of a human hand, is installed to be rotatable in the horizontal direction, a natural motion may be implemented like a human hand, such that an operation corresponding to a shape of an object may be accurately performed.

Figure 2:
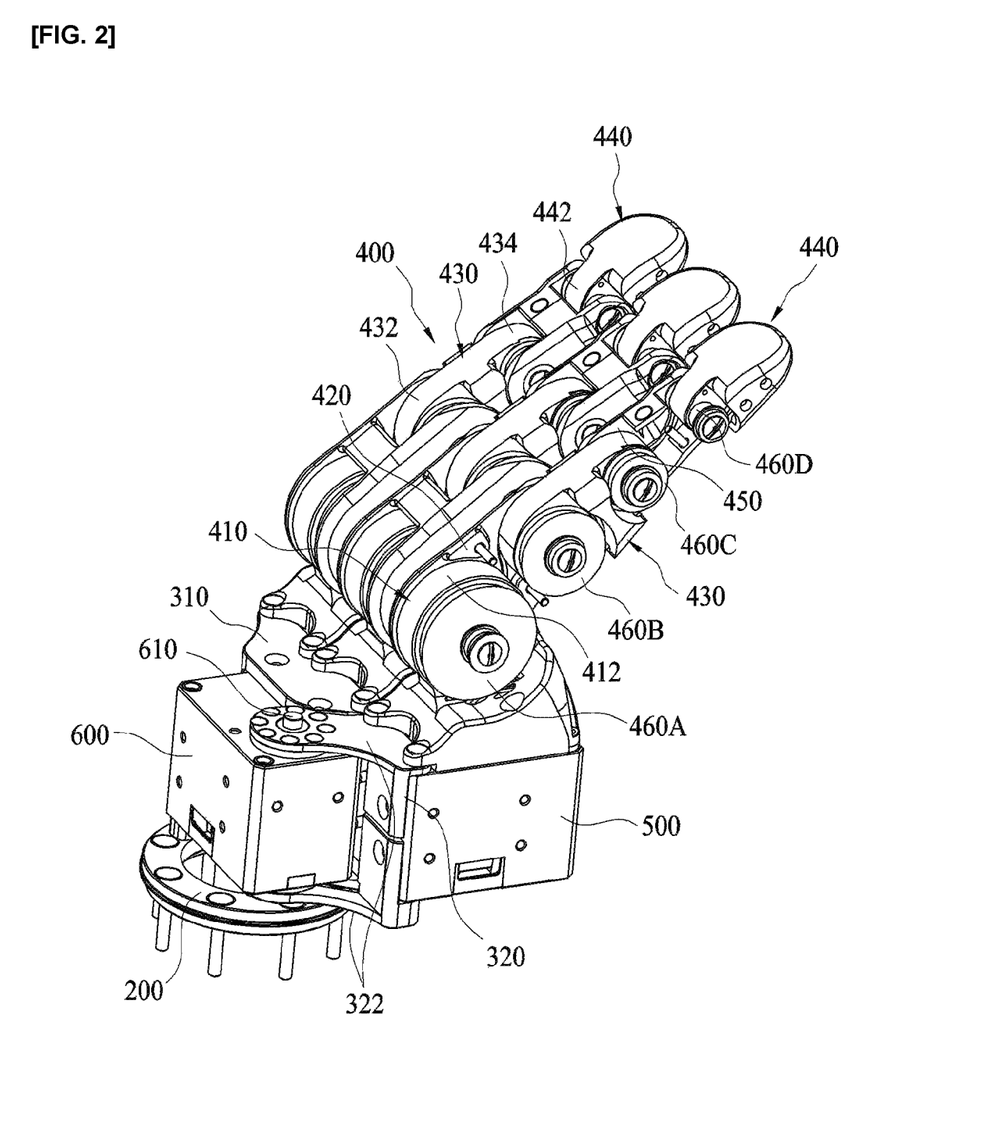
FIGS. 2 and 3 are partially exploded perspective views illustrating the configuration of the robot hand according to the exemplary embodiment of the present invention.
Figure 3:
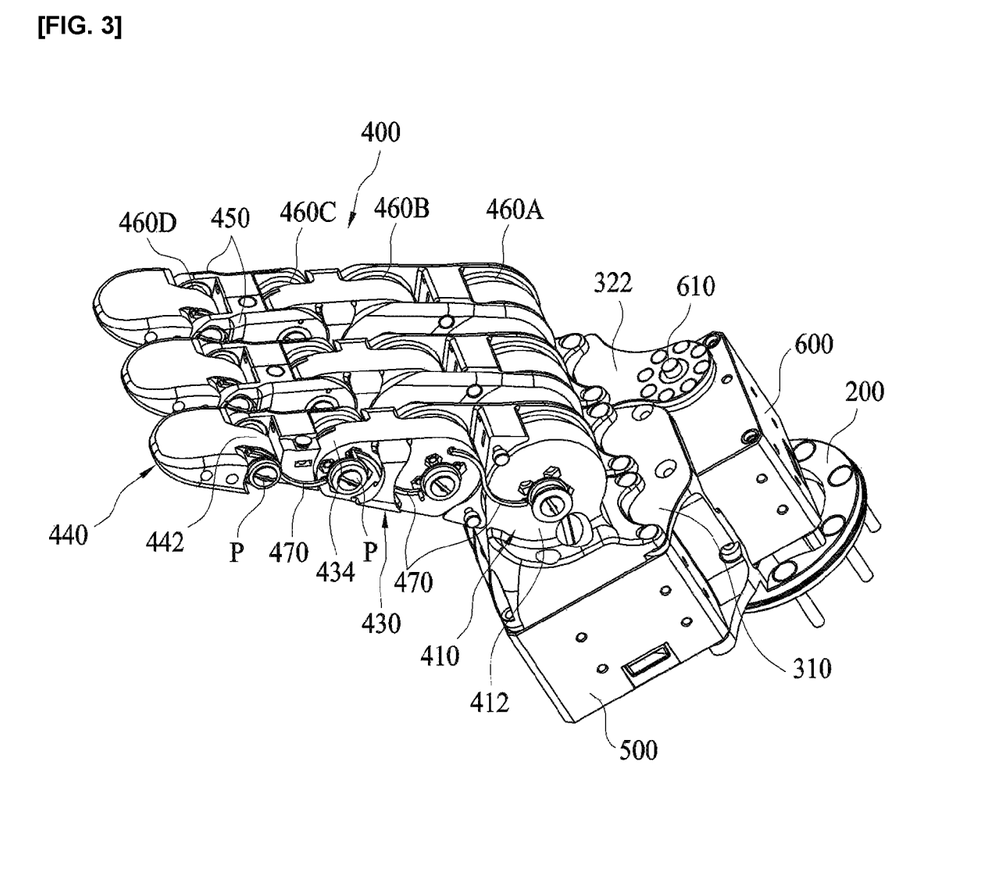

Meanwhile, as illustrated in FIGS. 1 to 3, in the present exemplary embodiment, the finger module 400 may include a first section 410, a second section 430, and a third section 440.

One side of the first section 410 is coupled to the upper portions of the first and second brackets 310 and 320, respectively. A first link 412 is provided at the other side of the first section 410. In the present exemplary embodiment, the first link 412 may be formed integrally with the first section 410. The first link 412 is a part connected to a second link 432 to be described below.

The second link 432 is provided at one side of the second section 430 so as to face the first link 412, and a third link 434 is provided at the other side of the second section 430 so as to face the second link 432.

In the present exemplary embodiment, the first link 412 and the second link 432 are connected to each other with a pair of side plates 420. The side plates 420 extend between the first link 412 and the second link 432. The side plates 420 are provided at both the first link 412 and the second link 432, respectively, and coupled to each other by hinge pins P to be described below.

As illustrated in FIGS. 1 to 3, a fourth link 442 is provided at one side of the third section 440 and positioned to face the third link 434 of the second section 430. The other side of the third section 440 is a free end portion and corresponds to an end of a human finger.

Figure 4:
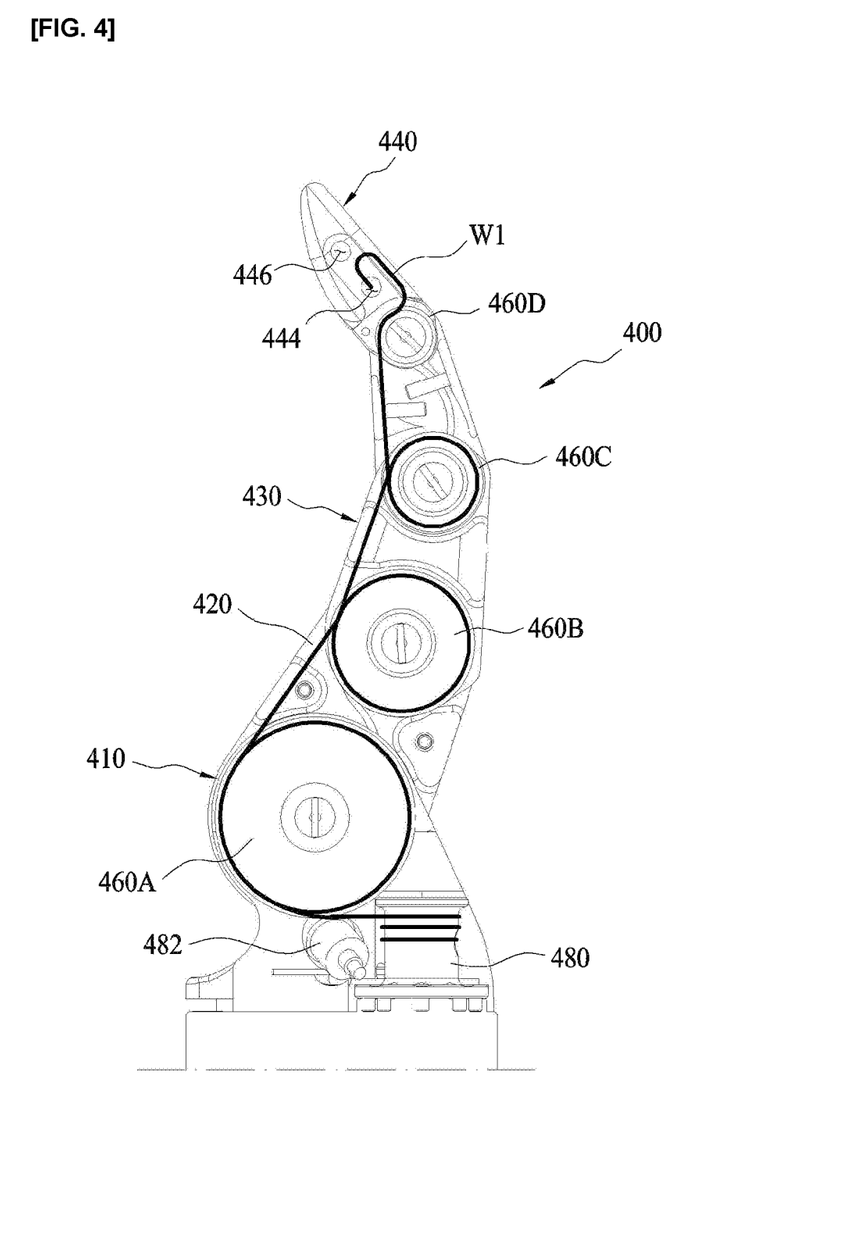
FIGS. 4 and 5 are cross-sectional views illustrating the configuration of the robot hand according to the exemplary embodiment of the present invention.
Figure 5:
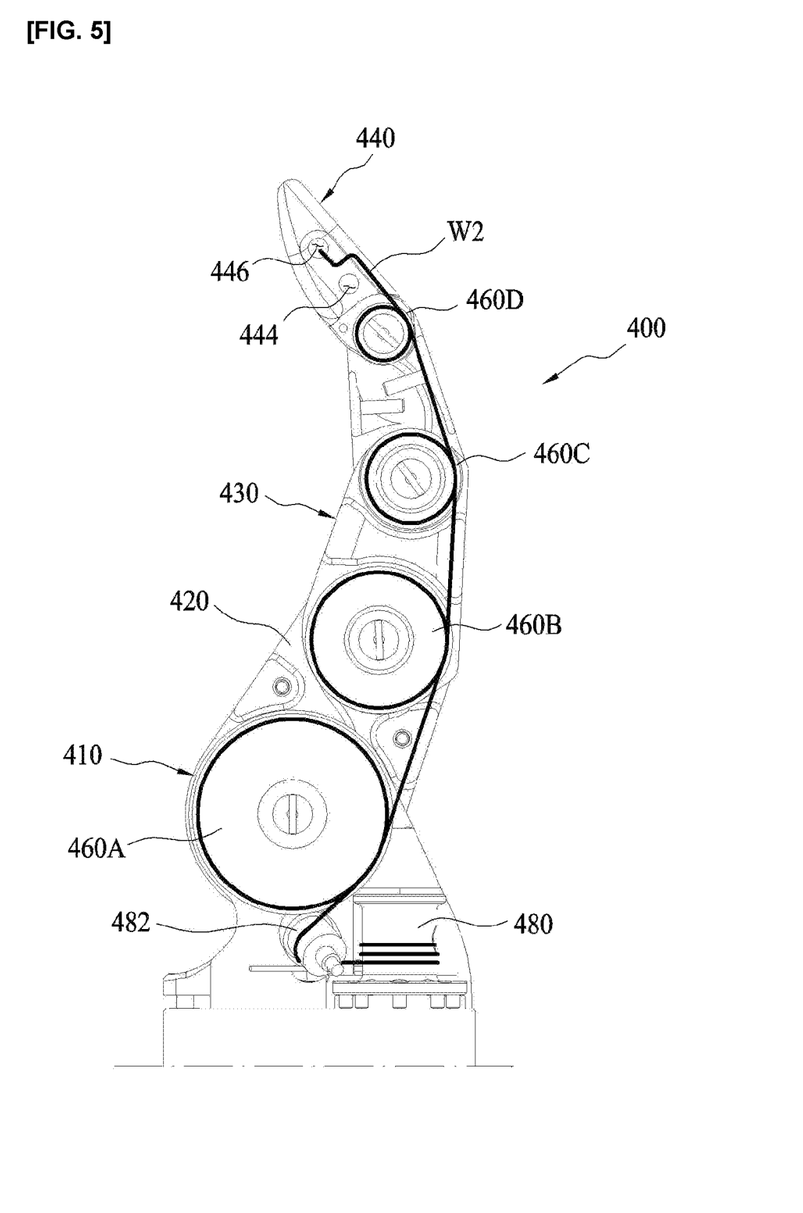

In the present exemplary embodiment, as illustrated in FIGS. 4 and 5, first and second fixing holes 444 and 446 may be formed at the free end portion of the fourth link 440, and one end of a first wire W1 and one end of a second wire W2, which will be described below, are fitted with and fixed to the first and second fixing holes 444 and 446, respectively.

The third link 434 and the fourth link 442 are connected to each other with a pair of side plates 450. The side plates 450 extend between the third link 434 and the fourth link 442. The side plates 450 are provided at both the third link 434 and the fourth link 442, respectively, and coupled to each other by the hinge pins P.

As described above, in the finger module 400 according to the exemplary embodiment of the present invention, the sections connected with the plurality of links cooperatively operate to implement the finger structure, such that the number of required components is reduced in respect to an operating range and a length of the finger module 400. As a result, the finger module 400 may be easily manufactured, and manufacturing costs may be reduced.

Meanwhile, as well illustrated in FIG. 3, elastic members 470 are connectively provided between the first link 412 and the second link 432, between the second link 432 and the third link 434, and between the third link 434 and the fourth link 442. In the present exemplary embodiment, the elastic member 470 is a linear spring, but the present invention is not necessarily limited thereto. For example, the elastic member 470 may be a flat spring.

The elastic members 470 serve to allow the first to third sections 410, 430, and 440, which are connected with the elastic members 470, to cooperatively operate. Further, the elastic members 470 provide elastic force in directions in which the elastic members 470 are compressed in a state in which the first to third sections 410, 430, and 440 are disposed at predetermined angles, for example, in a state in which the finger module is bent, and the elastic members 470 return to the original state in a state in which the finger module is spread.

Meanwhile, as illustrated in FIGS. 1 to 3, winding members 460A, 460B, 460C, and 460D each may be provided at any one of two sides of each of the first to fourth links 412, 432, 434, and 442. The winding members 460A, 460B, 460C, and 460D are positioned to face one another. The winding members 460A, 460B, 460C, and 460D may be formed integrally with the first to fourth links 412, 432, 434, and 442, respectively. The winding members 460A, 460B, 460C, and 460D are parts around which the first and second wires W1 and W2 are wound to be described below are wound.

As illustrated in FIGS. 1 to 3, the hinge pins P are rotatably installed and penetrate the first to fourth links 412, 432, 434, and 442, the winding members 460A, 460B, 460C, and 460D, and the respective side plates 420 and 450. Therefore, the first to third sections 410, 430, and 440 may be tilted relative to one another about the hinge pins P, respectively.

In the present exemplary embodiment, ball bearings B may be installed at both ends of the hinge pin P. The ball bearings B serve to support the hinge pin P so that the hinge pin P is rotatable.

Meanwhile, as illustrated in FIG. 4, one end of the first wire W1 is wound around the winding members 460A, 460B, 460C, and 460D. The first wire W1 connects the first to fourth links 412, 432, 434, and 442 and serves to transmit driving power so that the finger module 400 is bent toward the base 200 or spread.

As illustrated in FIG. 5, one end of the second wire W2 is wound around the winding members 460A, 460B, 460C, and 460D. The second wire W2 is wound in a direction opposite to a direction in which the first wire W1 is wound. The second wire W2 serves to transmit driving power so that the finger module 400 is bent toward the base 200 or spread.

The other end of the first wire W1 and the other end of the second wire W2 are wound around an outer circumferential surface of a pulley 480. The pulley 480 is a part connected to the finger drive unit 500. In the present exemplary embodiment, the pulleys 480 are provided on the upper portions of the first and second brackets 310 and 320, respectively. The pulley 480 is rotatably coupled to a rotary shaft (not illustrated) of the finger drive unit 500. Therefore, the pulley 480 may unwind or wind the first and second wires W1 and W2 by receiving rotational force from the rotary shaft.

In this case, since the directions in which the first and second wires W1 and W2 are wound are different from each other, one of the first and second wires W1 and W2 is lengthened and the other of the first and second wires W1 and W2 is shortened when the pulley 480 is rotated. As described above, the two wires are used to transmit driving power so that the finger module 400 is bent toward the base 200 or spread, and as a result, high strength and rigidity may be obtained and precise control may be improved in comparison with a case in which only a single wire is provided.

As illustrated in FIG. 4 or 5, a direction changing member 482 may be rotatably provided at a position adjacent to the pulley 480. The direction changing member 482 is disposed on a route of the first and second wires W1 and W2 extending toward the pulley 480 and serves to change extension directions of the first and second wires W1 and W2.

That is, the direction changing member 482 is provided at a side of the first link 412 and may change the directions of the first and second wires W1 and W2 from the first link 412 toward a lateral side, such that it is possible to prevent the first and second wires W1 and W2 from being withdrawn from the first link 412. In the present exemplary embodiment, a state in which only the second wire W2 is wound is shown, but the first wire W1 may also be wound around the direction changing member 482.

Meanwhile, the finger drive unit 500 and the rotation drive unit 600 each may be a servo motor or an actuator. In the present exemplary embodiment, the finger drive unit 500 is an actuator having a back-drivability function. The finger drive unit 500 and the rotation drive unit 600 may be further provided with a reduction gear (not illustrated) for adjusting a rotation ratio and an encoder (not illustrated) for detecting a rotation amount.

As described above, the finger module 400 according to the exemplary embodiment of the present invention has the elastic members 470, such that the finger module 400 may be quickly restored to the original state. The posture of the finger module 400 is controlled by the finger drive unit 500 that transmits driving power to bend or spread the finger module 400, such that the position of the finger module 400 may be accurately recognized, which enables precise control.

Meanwhile, the exemplary embodiments of the present invention are disclosed in the present specification and the drawings, and specific terms are used, but the specific terms are used as general meanings merely for easily explaining the technical contents of the present invention and helping understand the present invention, but not intended to limit the scope of the present invention. It is obvious to those skilled in the art to which the present invention pertains that other modified embodiments may be carried out based on the technical spirit of the present invention in addition to the exemplary embodiments disclosed herein.

INDUSTRIAL AVAILABILITY

The present invention relates to a robot hand which is possible to accurately perform an operation corresponding to a shape of an object.

What is claimed is:

1. A robot hand comprising:
a base;
a first bracket and a second bracket provided on an upper portion of the base;
a finger module coupled to an upper portion of the second bracket, and configured to tilt in order to grip an object;
a finger drive unit installed on the second bracket and configured to transmit driving power to the finger module; and
a rotation drive unit configured to transmit driving power so that the second bracket is rotatable in a horizontal direction about a driving shaft of the rotation drive unit,
wherein the finger module comprises,
a first section having one side coupled to the upper portion of the first bracket and the other side at which a first link is provided,
a second section having one side at which a second link is provided to face the first link, the second section being connected to the first section by two side plates extending between the first link and the second link, the second section having the other side at which a third link is provided to face the second link,
a third section having one side at which a fourth link is provided to face the third link of the second section, the third section being connected to the second section by two side plates extending between the third link and the fourth link, the third section having the other side which is a free end portion,
an elastic member connectively provided between the first link and the second link, between the second link and the third link, and between the third link and the fourth link so as to allow the first link, the second link, the third link, and the fourth link to cooperatively operate, the elastic member being configured to elastically support the first link, the second link, the third link, and the fourth link at angles,
a first wire and a second wire having one end wound around the first to fourth links to connect the first to fourth links, respectively,
a plurality of winding members being at any one of two sides of each of the first to fourth links to face one another, the one end of the first wire completely winding around at least some winding members among the winding members in a first winding direction, the one end of the second wire completely winding around at least some winding members among the winding members in a second winding direction, the second winding direction being opposite to the first winding direction,
a pulley having an outer circumferential surface around which the other end of the first wire and the other end of the second wire are wound, the pulley being connected to the finger drive unit, and
a single direction changing member rotatably provided at a position adjacent to the pulley in order to prevent the first wire and the second wire from being withdrawn from the first link, the single direction changing member configured to change an extension direction of one of the first wire and the second wire unwound from the pulley to be opposite to an extension direction of the other one of the first wire and the second wire.

2. The robot hand of claim 1, wherein the finger module further comprises:
hinge pins rotatably installed and penetrating the first to fourth links, the winding members, and the side plates; and
ball bearings installed at two ends of each of the hinge pins so as to support the hinge pins so that the hinge pins are rotatable.

3. The robot hand of claim 1, wherein first and second fixing holes are provided in the free end portion, and one end of the first wire and one end of the second wire are fitted with and fixed to the first and second fixing holes, respectively.

4. The robot hand of claim 1, wherein the elastic member is a flat spring or a linear spring.

5. The robot hand of claim 1, wherein the finger drive unit and the rotation drive unit each are a servo motor or an actuator.

6. The robot hand of claim 1, further comprising:
a plurality of finger modules including the finger module on the second bracket and second finger modules on the first bracket; and
a plurality of link arms provided on the second bracket, the link arms rotatably coupled to the driving shaft of the rotation drive unit to enable the second bracket and the finger module connected thereto to rotate about the driving shaft in the horizontal direction.

* * * * *